United States Patent
Wang et al.

(10) Patent No.: US 10,474,383 B1
(45) Date of Patent: Nov. 12, 2019

(54) USING OVERLOAD CORRELATIONS BETWEEN UNITS OF MANAGED STORAGE OBJECTS TO APPLY PERFORMANCE CONTROLS IN A DATA STORAGE SYSTEM

(71) Applicant: EMC IP Holding Company LLC, Hopkinton, MA (US)

(72) Inventors: Hui Wang, Upton, MA (US); Amnon Naamad, Brookline, MA (US); Sean Dolan, Southborough, MA (US); Xiaomei Liu, Southborough, MA (US); Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

(21) Appl. No.: 15/393,774

(22) Filed: Dec. 29, 2016

(51) Int. Cl.
*G06F 3/06* (2006.01)

(52) U.S. Cl.
CPC .......... *G06F 3/0634* (2013.01); *G06F 3/0616* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 6,157,963 A | 12/2000 | Courtright, II et al. | |
| 6,487,562 B1 | 11/2002 | Mason, Jr. et al. | |
| 6,611,903 B2 | 8/2003 | Fujimoto et al. | |
| 6,636,909 B1 | 10/2003 | Kahn et al. | |
| 7,047,322 B1 | 5/2006 | Bauman et al. | |
| 7,222,223 B2 | 5/2007 | Miller et al. | |
| 7,337,248 B1 | 2/2008 | Rao et al. | |
| 8,688,878 B1* | 4/2014 | Dolan | G06F 3/061 710/33 |
| 8,935,493 B1* | 1/2015 | Dolan | G06F 3/0649 711/117 |
| 9,507,887 B1* | 11/2016 | Wang | G06F 17/5009 |
| 2002/0103969 A1* | 8/2002 | Koizumi | G06F 3/0605 711/114 |
| 2003/0126200 A1* | 7/2003 | Wolff | G06F 9/52 709/203 |
| 2004/0044770 A1 | 3/2004 | Messick et al. | |
| 2008/0104283 A1 | 5/2008 | Shin et al. | |
| 2008/0222311 A1 | 9/2008 | Lee et al. | |

(Continued)

*Primary Examiner* — Michael Alsip
(74) *Attorney, Agent, or Firm* — BainwoodHuang

(57) ABSTRACT

Improved techniques for applying performance controls in a data storage system based on overload correlations between units of managed storage objects (UMOs). When a performance indicator (e.g. response time) for a target UMO is outside an acceptable range, a competing UMO that potentially shares at least one potentially shared hardware component with the target UMO is identified. An overload correlation between the target UMO and the competing UMO is generated that indicates an amount of correlation between the performance indicator for the target UMO and a performance indicator for the competing UMO. A performance control is then applied to the throughput of the competing UMO that reduces the throughput of the competing UMO. The amount that the throughput of the competing UMO is reduced is based on the amount of overload correlation between the target UMO and the competing UMO.

23 Claims, 8 Drawing Sheets

(56) References Cited

U.S. PATENT DOCUMENTS

2011/0119407 A1* 5/2011 Shah ..................... G06F 3/0611
710/6
2011/0252127 A1* 10/2011 Iyengar ................. G06F 9/5033
709/224

* cited by examiner

USING OVERLOAD CORRELATIONS BETWEEN UNITS OF MANAGED STORAGE OBJECTS TO APPLY PERFORMANCE CONTROLS IN A DATA STORAGE SYSTEM

TECHNICAL FIELD

The present disclosure relates generally to intelligent data storage systems, and more specifically to techniques for applying performance controls in a data storage system based on overload correlations between units of managed storage objects.

BACKGROUND

Data storage systems are arrangements of hardware and software that typically include multiple storage processors coupled to arrays of non-volatile storage devices, such as magnetic disk drives, electronic flash drives, and/or optical drives. The storage processors service host I/O requests that arrive from host machines. The received I/O requests specify storage objects (e.g. logical disks or "LUNs") that are to be written, read, created, or deleted. The storage processors run software that manages incoming I/O operations and performs various data processing tasks to organize and secure the host data stored on the non-volatile storage devices.

Previous data storage systems have applied performance controls when servicing host I/O requests, in order to meet service level objectives (SLOs) associated with storage objects. As it is generally known, the performance of a storage object may be measured in terms of an average response time for completing host I/O requests directed to the storage object. When the response time for host I/O requests directed to a storage object is greater than a response time SLO associated with the storage object, the storage object is said to be "under-achieving." When the response time for host I/O requests directed to a storage object is less than a response time SLO associated with the storage object, the storage object is said to be "over-achieving."

Previous data storage systems have also monitored the performance of individual hardware components that are used to service host I/O requests, in terms of performance indicators that were available for individual hardware components such as utilization, response time and workload. Upper limits have been defined for individual hardware components in terms of utilization, response time, and workload. Overloading of specific hardware components has been detected when limits on the monitored performance indicators were exceeded for the hardware components. Previous systems have applied performance controls to attempt to balance the workload of a data storage system across its various internal hardware components, in order to minimize the frequency and/or probability that any given component becomes overloaded.

SUMMARY

Unfortunately, previous systems have had significant shortcomings with regard to applying performance controls in a way that accounts for sharing of hardware components between storage objects, particularly when performance data is unavailable from individual hardware components. Accordingly, previous technologies do not provide a way for performance controls to be applied in a way that effectively addresses the problem of overloading shared hardware components in a data storage system. This is a significant shortcoming, since overloading of a shared hardware component may cause one or more storage objects to miss their response time SLOs, potentially due to utilization of the shared component by other storage objects. When performance data is unavailable from individual hardware components, such overloading cannot be effectively addressed by previous systems.

To address these and other shortcomings of previous systems, improved techniques are disclosed herein for applying performance controls in a data storage system based on overload correlations between units of managed storage objects (UMOs). In the disclosed techniques, a performance indicator is monitored for each one of multiple UMOs in a data storage system. Each UMO may, for example, be made up of one or more storage groups, each of which includes one or more storage objects accessed by one or more host systems. The performance indicator for each UMO may, for example, be average response time for processing host I/O operations received by the data storage system and directed to the storage objects in the UMO.

The disclosed techniques detect that a current level of the performance indicator for one of the monitored UMOs is outside an acceptable range. For example, the disclosed techniques may detect that a current response time of a UMO exceeds a response time SLO associated with the UMO. The UMO having a performance indicator outside of the acceptable range is referred to as the target UMO. In response to detecting that the current level of the performance indicator for a target UMO is outside the acceptable range, the disclosed techniques generate an overload correlation between the target UMO and each one of a set of competing UMOs. The set of competing UMOs may, for example, be made up of all other UMOs within the same data storage system as the target UMO. Each one of the competing UMOs potentially shares at least one hardware component in the data storage system with the target UMO.

The overload correlation generated between the target UMO and one of the competing UMOs indicates an amount of correlation between the performance indicator for the target UMO and a performance indicator for the competing UMO. Examples of performance indicators for the competing UMO include the throughput of the competing UMO and/or the response time of the competing UMO. The throughput of the competing UMO may, for example, be a rate at which host I/O operations directed to the storage objects in the competing UMO are processed by the data storage system, expressed in terms of I/O operations per second or "IOPS", or in terms of bytes per second. The response time of the competing UMO may, for example, be average response time for processing host I/O operations received by the data storage system and directed to the storage objects in the competing UMO.

The disclosed techniques then apply a performance control to the throughputs of each one of competing UMOs according to the overload correlations between the target UMO and the competing UMOs, to bring the performance indicator for the target UMO within the acceptable range. For example, the performance control applied to each one of the competing UMOs may reduce the throughput of the competing UMO by an amount that is based on the overload correlation between the target UMO and that competing UMO.

For example, a performance control may be applied to the throughput of a competing UMO that adds delay to the response time for completing I/O operations directed to storage objects in the competing UMO, thus reducing the throughput of the competing UMO. The specific amount of delay added may be determined based on the overload correlation between the target UMO and the competing UMO, e.g. higher overload correlations may cause higher amounts of delay to be added. In another example, a performance control may be applied to the throughput of a competing UMO that limits the rate at which host I/O operations directed to the competing UMO are accepted for processing by the data storage system. The specific limit on the rate for accepting host I/O operations directed to the competing UMO for processing may be determined based on the overload correlation between the target UMO and the competing UMO, e.g. higher overload correlations may cause lower limits to be placed on the rate at which host I/O requests directed to the competing UMO are accepted for processing. And in another example, a frequency at which a response time delay is applied to host I/O requests directed to a competing UMO may be determined based on the overload correlation between the target UMO and the competing UMO, e.g. higher overload correlations may cause the response time delay to be added more frequently to the host I/O requests directed to the competing UMO.

The overload correlation between the target UMO and the competing UMO may be a potential overload correlation, indicating that an overload is potentially occurring on a hardware component that is potentially shared by the target UMO and the competing UMO. In a first example in which the correlation between the target UMO and the competing UMO is a potential overload correlation, the disclosed techniques may be embodied such that the performance indicator monitored for the target UMO is an average response time for host I/O operations directed to the target UMO, and such that each of the competing UMOs potentially shares at least one potentially shared hardware component with the target UMO. Generating the overload correlation between the target UMO and each one of the competing UMOs may include calculating a weighted average response time of the target UMO with respect to each one of the competing UMOs, where the weighted average response time of the target UMO with respect to a competing UMO is equal to the average response time of the target UMO weighted by the throughput of the competing UMO. A weighted average throughput of the target UMO may also calculated with respect to each one of the competing UMOs, where the weighted average throughput of the target UMO with respect to a competing UMO is equal to the average throughput of the target UMO weighted by the throughput of the competing UMO. The overload correlation between the target UMO and each one of the competing UMOs may be generated as a product of i) the weighted average response time of the target UMO with respect to the competing UMO and ii) the weighted average throughput of the target UMO with respect to the competing UMO, divided by a sum of the overload correlations between the target UMO and all of the competing UMOs.

In a second example in which the correlation between the target UMO and the competing UMO is a potential overload correlation, the disclosed techniques may be embodied such that generating the overload correlation between the target UMO and the competing UMO may also include calculating a weighted average response time of the target UMO with respect to each one of the competing UMOs, where the weighted average response time of the target UMO with respect to a competing UMO is equal to the average response time of the target UMO weighted by the throughput of the competing UMO, and alternatively or additionally generating an overload correlation between the target UMO and each one of the competing UMOs equal to i) the weighted average response time for the target UMO with respect to the competing UMO, divided by ii) a sum of the overload correlations between the target UMO and all competing UMOs.

In a third example in which the correlation between the target UMO and the competing UMO is a potential overload correlation, the disclosed techniques may be embodied to further include calculating a self-weighted response time of the target UMO that is equal to the average response time of the target UMO weighted by the throughput of the target UMO. The weighted average response time of the target UMO with respect to each competing UMO may be compared to the self-weighted response time for the target UMO. The disclosed techniques may then apply a performance control only to those competing UMOs for which the weighted average response time of the target UMO with respect to the competing UMO exceeds the self-weighted response time of the target UMO.

In another aspect of the disclosed techniques, a strong overload correlation factor may also be determined for each competing UMO, based on detecting actual overloads occurring on a hardware component that is potentially shared by the target UMO and the competing UMO, in cases where such actual overloads can be detected based on monitored performance indicators for the target UMO and the competing UMO. In such an embodiment, a strong overload correlation factor between the target UMO and each competing UMO may be determined by detecting time intervals when the competing UMO experiences overload of the potentially shared hardware component, and time intervals when the target UMO experiences overload of the potentially shared hardware component. In response to detecting that the competing UMO experiences overload of the potentially shared hardware component in a time interval during which the target UMO also experiences overload of the potentially shared hardware component, the strong overload correlation factor between the target UMO and the competing UMO is incremented. In response to detecting that the competing UMO experiences overload of the potentially shared hardware component in a time interval during which the target UMO does not also experience overload of the potentially shared hardware component, the strong correlation factor between the target UMO and the competing UMO is decremented. In response to detecting that the target UMO experiences overload of the potentially shared hardware component in a time interval during which the competing UMO does not also experience overload of the potentially shared hardware component, the strong correlation factor between the target UMO and the competing UMO is decremented.

The strong overload correlation factor between the target UMO and each competing UMO may then be used to control application of performance controls to the competing UMOs when a current level of the performance indicator for the target UMO is outside the acceptable range. For example, performance controls may be applied to competing UMOs only when the strong overload correlation factor between the target UMO and a competing UMO exceeds a predetermined minimum threshold, e.g. a positive value, since a positive strong overload correlation only arises when the target UMO and competing UMO both experience known overload conditions at the same time.

Embodiments of the disclosed techniques may provide significant advantages over previous approaches. For example, the disclosed techniques apply performance controls in a way that accounts for sharing of hardware components between UMOs, even when performance data is unavailable from individual hardware components. Accordingly, the disclosed techniques advantageously provide for performance controls to be applied in a way that addresses the problem of overloading in shared hardware components of a data storage system. Overloading of shared hardware components may otherwise cause one or more UMOs to miss their response time SLOs, due in significant part to utilization of the shared component by other storage objects. The disclosed system enables performance controls to be applied to over-achieving UMOs in order improve the performance of under-achieving UMOs, in cases where the under-achieving may be caused by overloading of a shared hardware component.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the present invention is broader than the specific embodiments disclosed below.

Figure 1:
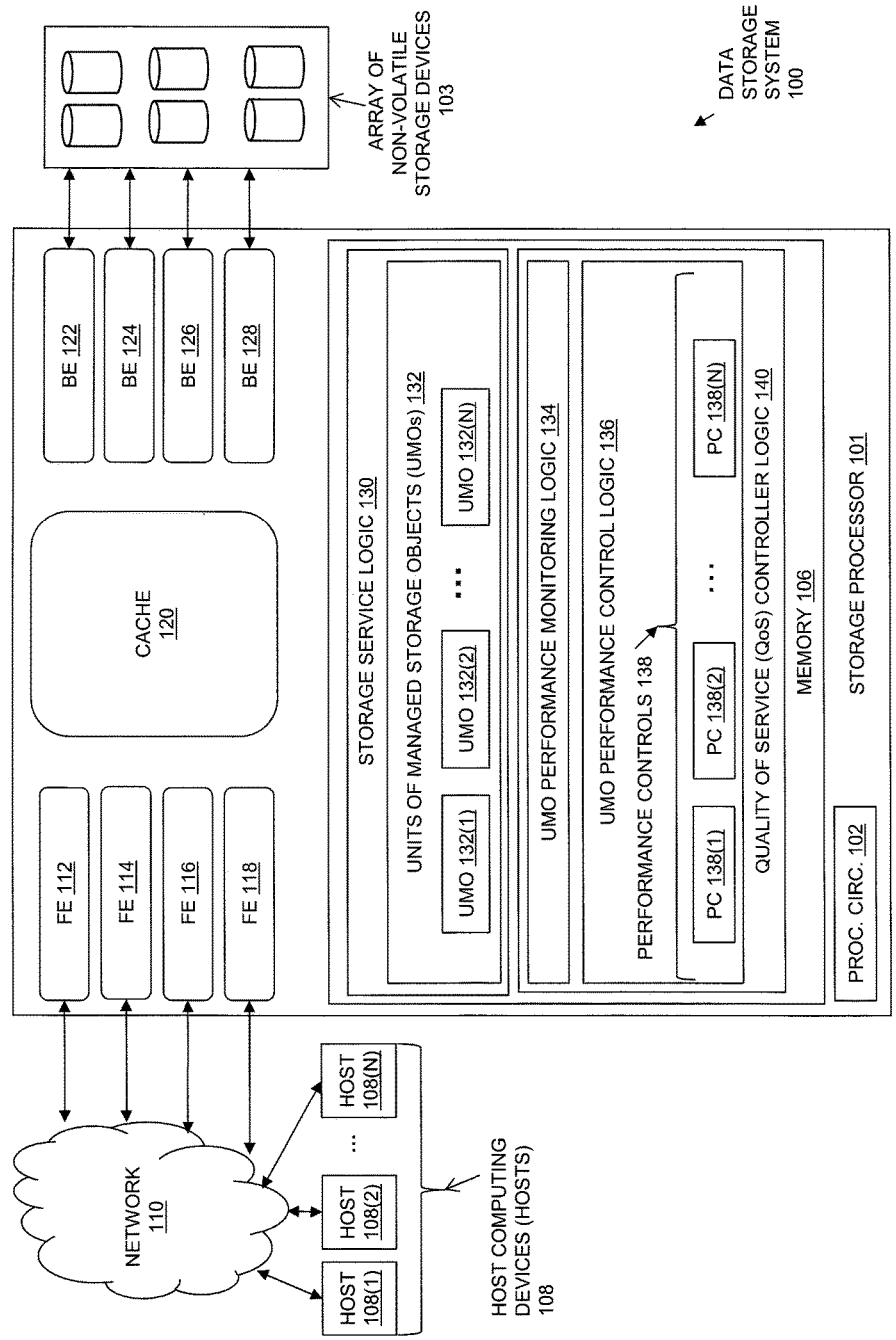
FIG. 1 is a block diagram showing an example of a data storage environment including components of an embodiment of the disclosed techniques.

FIG. 1 is a block diagram showing an example of a data storage environment including components of an illustrative embodiment of the disclosed techniques. The data storage environment of FIG. 1 includes some number of Host Computing Devices 108, referred to as "hosts", shown for purposes of illustration by Hosts 108(1) through 108(N). The Hosts 108 access data storage provided by Data Storage System 100, for example over one or more computer networks, such as a local area network (LAN), and/or a wide area network (WAN) such as the Internet, etc., and shown in FIG. 1 by Network 110. Data Storage System 100 includes at least one Storage Processor 101 and an Array of Non-Volatile Storage Devices 103. Storage Processor 101 may be provided as a circuit board assembly, or "blade," which plugs into a chassis that encloses and cools multiple storage processors, and that has a backplane for interconnecting storage processors. However, no particular hardware configuration is required, and Storage Processor 101 may be embodied as any specific type of computing device capable of processing host input/output (I/O) operations (e.g. host I/O read and host I/O write operations).

The Array of Non-Volatile Storage Devices 103 may include magnetic disk drives, electronic flash drives, and/or optical drives. Array of Non-Volatile Storage Devices 103 may be directly physically connected to Storage Processor 101, or may be communicably connected to Storage Processor 101 by way of one or more computer networks, e.g. including or consisting of a Storage Area Network (SAN) or the like.

During operation, Storage Processor 101 processes host I/O operations, e.g. I/O read and I/O write operations, that are received from Hosts 108 over Network 110. The host I/O operations specify storage objects that are to be written, read, created, or deleted. The storage objects specified by the host I/O operations may, for example, be logical disks referred to as "LUNs" that are served by Data Storage System 100 to Hosts 108. The host data stored in storage objects served by Data Storage System 100 Storage Processor 101 is ultimately stored in units of storage allocated to the storage objects from Array of Non-Volatile Storage Devices 103. The units of storage allocated from Array of Non-Volatile Storage Devices 103 are used to persistently store the host data indicated by the host I/O operations received by Storage Processor 101. The drives within Array of Non-Volatile Storage Devices 103 are one example of potentially shared hardware components that are used when Storage Processor 101 services received host I/O operations.

FIG. 1 shows other examples of potentially shared hardware components that are used when Storage Processor 101 services host I/O operations. For example, Storage Processor 101 includes a number of front end processors, shown by FE 112, FE 114, FE 116, and FE 118. Each one of the front end processors includes one or more communication ports that are operable to receive host I/O operations from Hosts 108 over Network 110.

Another example of a potentially shared hardware component that is used when Storage Processor 101 services host I/O operations is Cache 120. Storage Processor 101 may process host I/O operations by reading host data from, and/or writing host data to, the Cache 120. For example, when processing a host I/O read operation, if the host data requested by the operation is present in Cache 120, then Storage Processor 101 may service the operation at least in part by obtaining the requested host data from Cache 120, without having to access a drive in the Array of Non-Volatile Storage Devices 103 on which the host data is ultimately stored. In the case of a received I/O write operation, Storage Processor 101 may store the data specified by the operation into Cache 120, and then provide an acknowledgment to the host that issued the write operation, also without having to access a drive in the Array of Non-Volatile Storage Devices 103 on which the host data will ultimately be stored. When Cache 120 subsequently performs a flushing operation, the host data from the write operation is sent to the appropriate drive in the Array of Non-Volatile Storage Devices 103.

Another example of potentially shared hardware components that are used when Storage Processor 101 services host I/O operations is a number of back end processors, shown by BE 122, BE 124, BE 126, and BE 128. Each one of the back end processors includes one or more communication ports that are operable to read host data from and/or write host data to the drives in Array of Non-Volatile Storage Devices 103.

A Memory 106 in Storage Processor 101 stores program code that is executable on Processing Circuitry 102. Memory 106 may include volatile memory (e.g., RAM), and/or non-volatile memory, such as one or more ROMs, disk drives, solid state drives, and the like. The Processing Circuitry 102 may, for example, include or consist of one or more microprocessors, e.g. central processing units (CPUs), multi-core processors, chips, and/or assemblies, and associated circuitry. Processing Circuitry 102 and Memory 108 together form control circuitry, which is constructed and arranged to carry out various methods and functions as described herein. The Memory 106 stores a variety of software components that may be provided in the form of executable program code. For example, as shown in FIG. 1, Memory 106 may include software components such as Storage Service Logic 130, and Quality of Service (QoS) Controller Logic 140. When the program code is executed by Processing Circuitry 102, Processing Circuitry 102 is caused to carry out the operations of the software components. Although certain software components are shown and described for purposes of illustration and explanation, those skilled in the art will recognize that Memory 106 may include various other software components, such as an operating system, and various other applications, processes, etc.

Storage Service Logic 130 operates to serve storage objects, such as LUNs, to the Hosts 108, such that the host I/O operations issued by Hosts 108 can specify such storage objects. Storage Service Logic 130 uses the hardware components in Storage Processor 101, e.g. drives in Array of Non-Volatile Storage Devices 103, the front end processors FE 112, FE 114, FE 116 and FE 118, and the back end processors BE 122, BE 124, BE 126 and BE 128, to process the host I/O operations received by Storage Processor 101. Individual ones of the hardware components in Storage Processor 101 may be used by Storage Service Logic 130 when processing host I/O operations directed to multiple storage objects. In this way a given one of the hardware components in Storage Processor 101 may potentially be shared between two or more different storage objects that are served to Hosts 108.

The disclosed techniques operate on units of managed objects (UMOs), which are each made up of one or more storage groups. Each storage group may be made up of one or more of the storage objects served by Storage Service Logic 130 to Hosts 108. Since the potentially shared hardware components of Storage Processor 101 may be shared between different storage objects, different ones of the UMOs served by Storage Processor 101 may actually share one or more of the potentially shared hardware components of Storage Processor 101. FIG. 1 shows UMOs 132, which for purposes of illustration are shown including UMO 132(1) through UMO 132(N), within the Storage Service Logic 130.

Quality of Service (QoS) Controller Logic 140 includes UMO Performance Monitoring Logic 134 and UMO Performance Control Logic 136. UMO Performance Monitoring Logic 134 monitors the performance of each UMO in UMOs 132. For example, UMO Performance Monitoring Logic 134 may monitor a current level of one or more performance indicators for each UMO in UMOs 132, in order to determine whether the performance indicator is within an acceptable range for that UMO. One example of a performance indicator for a UMO is a response time for processing host I/O operations directed to the UMO, e.g. an average response time for processing host I/O operations directed to the storage objects in the UMO measured for each one of multiple equal length time intervals occurring during a sampling time period. UMO Performance Monitoring Logic 134 may also monitor the throughput of each UMO in UMOs 132. The throughput of a UMO may, for example, be a rate at which host I/O operations directed to the storage objects in the UMO are processed by the data storage system over some time period, measured for each one of multiple equal length time intervals occurring during a sampling time period, and measured in terms of I/O operations per second or "IOPS", or in terms of bytes per second.

UMO Performance Monitoring Logic 130 compares the current level of a performance indicator for each UMO to an acceptable range, e.g. compares a response time for each UMO to an acceptable response time range, e.g. a response time service level objective (SLO) for that UMO. In response to determining that the current level of a performance indicator for a UMO is outside the acceptable range for the UMO (e.g. the current response time for a UMO is greater than the response time SLO for the UMO), UMO Performance Monitoring Logic 130 determines that the UMO is a target UMO for performance improvement, and identifies one or more competing UMOs that potentially share at least one hardware component with the target UMO. For example, UMO Performance Monitoring Logic 130 may identify one or more of the UMOs in UMOs 132 other than the target UMO as competing UMOs, since the UMOs in UMOs 132 other than the target UMO may share at least one of the potentially shared hardware components of Storage Processor 101 with the target UMO. UMO Performance Monitoring Logic 134 then generates an overload correlation between the target UMO and each one of the competing UMOs. The overload correlation between the target UMO and a competing UMO indicates an amount of correlation between the performance indicator for the target UMO and a performance indicator for the competing UMO. Examples of performance indicators for the competing UMO include the throughput of the competing UMO and/or the response time of the competing UMO. The throughput of the competing UMO may, for example, be a rate at which host I/O operations directed to the storage objects in the competing UMO are processed by the data storage system, expressed in terms of I/O operations per second or "IOPS", or in terms of bytes per second. The response time of the competing UMO may, for example, be average response time for processing host I/O operations received by the data storage system and directed to the storage objects in the competing UMO.

In response to the overload correlation generated between the target UMO and the competing UMO, UMO Performance Control Logic 136 apply one of Performance Controls 138 (e.g. one of PC 138(1) through PC 138(N)) to the throughput of one or more of the competing UMOs, until the performance indicator for the target UMO is within the acceptable range. A performance control applied to the throughput of a competing UMO reduces the throughput of the competing UMO, by an amount that is based on the overload correlation between the target UMO and the competing UMO, in order to improve the performance of the target UMO.

For example, a performance control from Performance Controls 138 may be applied by UMO Performance Control Logic 136 to the throughput of a competing UMO that adds delay to the response time for completing I/O operations directed to the storage objects in the competing UMO, thus reducing the throughput of the competing UMO. The specific amount of delay added may be determined based on the overload correlation between the target UMO and the competing UMO, e.g. higher values of overload correlation may cause higher amounts of delay to be added to the time for completing I/O operations directed to the storage objects in the competing UMO. In another example, a performance control may be applied to the throughput of a competing UMO that limits the rate at which host I/O operations directed to storage objects in the competing UMO are accepted for processing by the data storage system. The specific rate limit for accepting host I/O operations directed to storage objects in the competing UMO for processing may be determined based on the overload correlation between the target UMO and the competing UMO, e.g. higher values of overload correlation may cause lower limits to be placed on the rate at which host I/O requests directed to storage objects in the competing UMO are accepted for processing. And in another example, a frequency at which a response time delay is applied to host I/O requests directed to storage objects in a competing UMO may be determined based on the overload correlation between the target UMO and the competing UMO, e.g. higher overload correlations causing the response time delay to be added more frequently to the processing of host I/O requests directed to the storage objects in the competing UMO.

Figure 2:
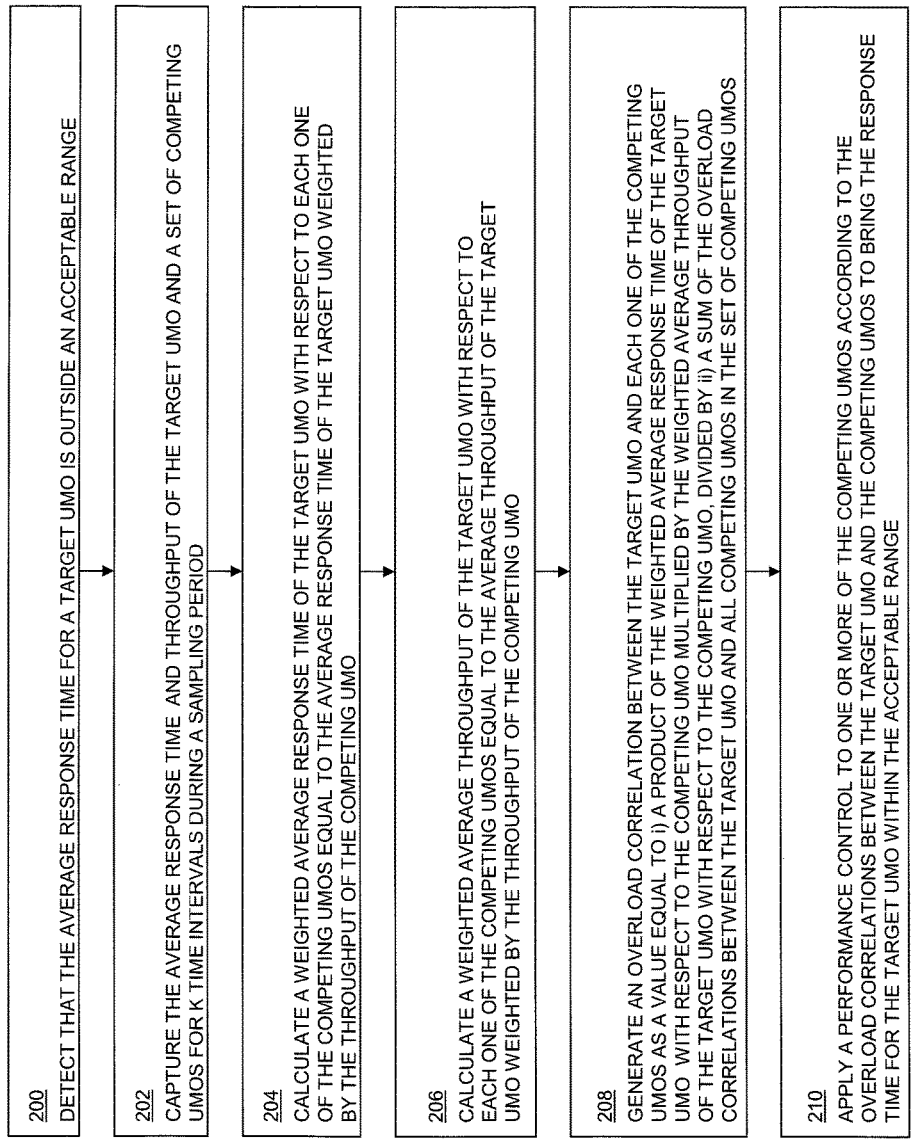
FIG. 2 is a flow chart showing a first example of steps that may be performed by the disclosed system to generate an overload correlation between a target UMO and a competing UMO, where the overload correlation is a potential overload correlation.
Figure 3:
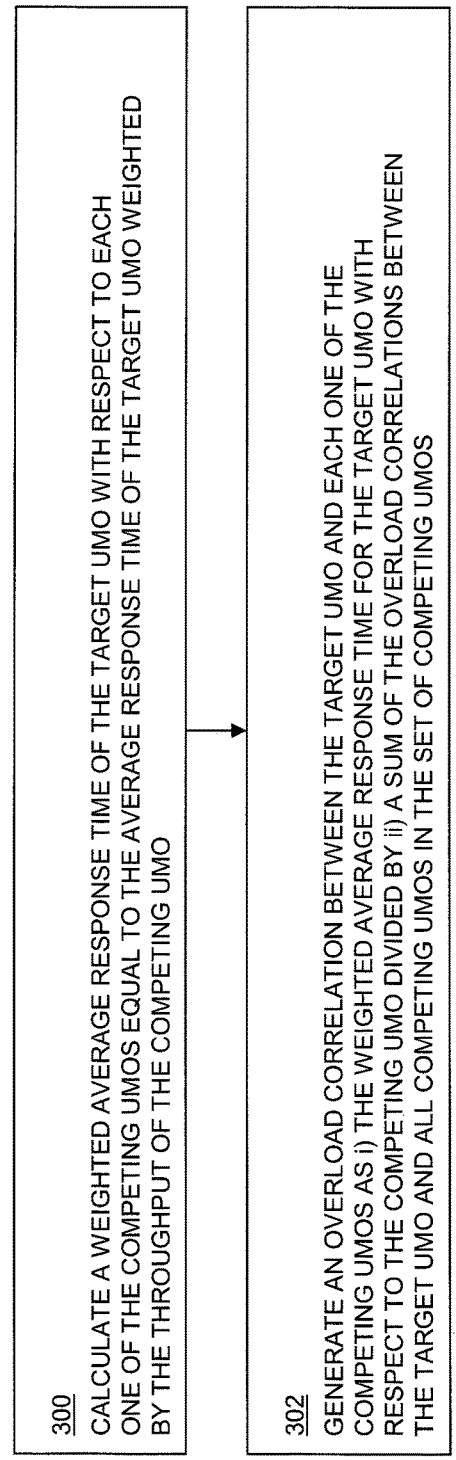
FIG. 3 is a flow chart showing a second example of steps that may be performed by the disclosed system to generate an overload correlation between a target UMO and a competing UMO, where the overload correlation is a potential overload correlation.
Figure 4:
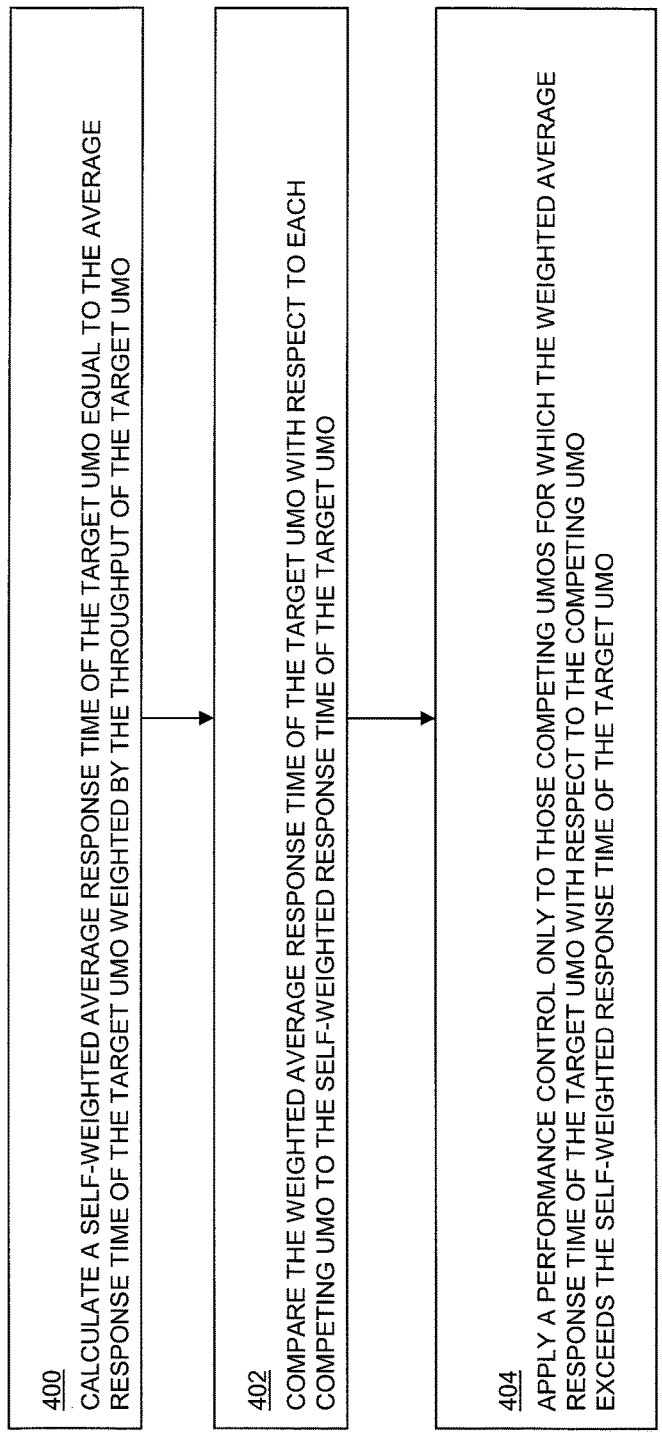
FIG. 4 is a flow chart showing a third example of steps that may be performed by the disclosed system to generate an overload correlation between a target UMO and a competing UMO, where the overload correlation is a potential overload correlation.

The overload correlation between the target UMO and the competing UMO may be a potential overload correlation, providing an indication of a potential overload that may be occurring on a hardware component potentially shared by the target UMO and the competing UMO. FIGS. 2-4 show examples in which the correlation between the target UMO and the competing UMO is a potential overload correlation.

FIG. 2 is a flow chart showing a first example of steps by which the disclosed system may generate an overload correlation between a target UMO and a competing UMO, where the overload correlation is a potential overload correlation. The steps of FIG. 2 may, for example, be performed by the UMO Performance Monitoring Logic 134 shown in FIG. 1.

In the example of FIG. 2, at step 200, a determination is made that a current level of the performance indicator for one of a group of monitored UMOs is outside an acceptable range. For example, the disclosed techniques may detect that a current response time of a UMO exceeds an average response time SLO associated with the UMO. The UMO having a performance indicator outside of the acceptable range is referred to as the target UMO. Accordingly, at step 200, a determination is made that a target UMO has an average response time that is outside of an acceptable range.

In response to detecting that the average response time of the target UMO is outside the acceptable range, an overload correlation is generated in steps 202-208 between the target UMO and each one of a set of competing UMOs. The set of competing UMOs may, for example, be made up of all other UMOs within the same data storage system as the target UMO, since each other UMO within the same data storage system containing the target UMO potentially shares at least one hardware component with the target UMO.

At step 202, the average response time and throughput of the target UMO and each one of the competing UMOs are captured for each one of some number K equal duration time intervals occurring within a sampling period. Each time interval may, for example, have a duration equal to a predetermined number of seconds.

At step 204, a weighted average response time of the target UMO is calculated with respect to each of the competing UMOs. The weighted average response time of the target UMO with respect to a competing UMO is equal to the average response time of the target UMO weighted by the throughput of the competing UMO. Accordingly, for a given one of the competing UMOs, for each one of the K time intervals, the average response time of the target UMO is multiplied by the throughput of the competing UMO during the same time interval. The resulting K products are then added together, and that sum is then divided by a sum of the K throughputs of the competing UMO in the K time intervals to generate the weighted average response time of the target UMO with respect to that competing UMO. In this way the weighted average response time for the target UMO with respect to each competing UMO is weighted by the throughput of the competing UMO, to indicate how heavily influenced the average response time of the target UMO is by the throughput of the competing UMO.

At step 206, a weighted average throughput of the target UMO is calculated with respect to each one of the competing UMOs. The weighted average throughput of the target UMO with respect to a competing UMO is equal to the average throughput of the target UMO weighted by the throughput of the competing UMO. Accordingly, for a given one of the competing UMOs, for each one of the K time intervals, the throughput of the target UMO is multiplied by the throughput of the competing UMO during the same time interval. The resulting K products are then added together, and that sum is then divided by a sum of the K throughputs of the competing UMO in the K time intervals to generate the weighted average throughput of the target UMO with respect to that competing UMO. In this way the weighted average throughput for the target UMO with respect to each competing UMO is weighted by the throughput of the competing UMO, to indicate how heavily influenced the throughput of the target UMO is by the throughput of the competing UMO.

At step 208, the overload correlation between the target UMO and each one of the competing UMOs is be generated. The overload correlation between the target UMO and one of the competing UMOs is calculated by generating a value equal to i) a product of the weighted average response time of the target UMO with respect to the competing UMO multiplied by the weighted average throughput of the target UMO with respect to the competing UMO, divided by ii) a sum of the overload correlations between the target UMO and all of the competing UMOs.

At step 210, a performance control is applied to one or more of the competing UMOs according to the overload correlations between the target UMO and the competing UMOs to bring the average response time for the target UMO within the acceptable range.

In an example in which each UMO consists of a single storage group (SG), for a target storage group Sg_i, the throughput of a competing storage group Sg_j may be reduced by applying a performance control that imposes an additional response time delay or a limit on throughput for the competing storage group, where the amount of throughput reduction provided by the performance control is weighted by the overload correlation between Sg_i and Sg_j, as for example shown by the below equations:

$$\overline{Rt_{ij}} = \frac{\Sigma_k Rt_i^k * Wkld_j^k}{\Sigma_k Wkld_j^k} \quad (1)$$

$$\overline{Wkld_{ij}} = \frac{\Sigma_k Wkld_i^k * Wkld_j^k}{\Sigma_k Wkld_i^k} \quad (2)$$

where $Wkld_i^k$ is the workload (i.e. throughput) measured for Sg_i during a time interval k.

$Wkld_j^k$ is the workload (i.e. throughput) measured for Sg_j during a time interval k.

$Rt_i^k$ is the average response time of Sg_i measured during a time interval k.

Equation (1) produces an example of a weighted average response time $\overline{Rt_{ij}}$ of Sg_i with respect to competing storage group Sg_j, and is an example of a calculation that may be performed in step 204 of FIG. 2. Equation (2) produces an example of a weighted throughput $\overline{Wkld_{ij}}$ of Sg_i with respect to the competing storage group Sg_j, and is an example of the calculation that may be performed in step 206 of FIG. 2. $\overline{Wkld_{ij}}$ is an example of a potential correlation between the workloads of Sg_i and Sg_j.

Equations (3) and (4) below show an example of how an overload correlation between Sg_i and Sg_j may then be generated, as in step 208 of FIG. 2, e.g. as a weight for a performance control that is applied to Sg_j, so that the resulting amount of reduction in the average response time of Sg_i is based on the overload correlation between Sg_i and Sg_j. The weight determined in equation (4) is an example of an overload correlation that may be used to control the amount of throughput reduction that is caused by a performance control applied to Sg_j in order to reduce the average response time of Sg_i. The same process may also be applied to obtain and apply an overload correlation weighting for performance controls applied to each other competing storage group that potentially shares a hardware component with Sg_i.

Equation (3) below produces $W_{ij}$, which is a potential impact on the average response time of Sg_i due to sharing one or more hardware components with Sg_j:

$$W_{ij} = \overline{Rt_{ij}} * \overline{Wkld_{ij}} \quad (3)$$

As noted above, $\overline{Rt_{ij}}$ represents a potential correlation between the average response time of Sg_i and the throughput of Sg_j, and $\overline{Wkld_{ij}}$ represents the potential correlation between the workloads of Sg_i and Sg_j. The final overload correlation generated at step 208 for weighting the performance control applied to Sg_j in order to improve the performance of Sg_i is given by equation (4):

$$\overline{W_{ij}} = \frac{W_{ij}}{\Sigma_m W_{im}} \quad (4)$$

where $W_{ij}$ is computed by equation (3) above, and $W_{im}$ is the overload correlation between Sg_i and each of the other competing storage groups in the set of competing storage groups that includes Sg_j. Thus equation (4) shows an example of how an overload correlation between Sg_i and Sg_j may be generated as a product $W_{ij}$ of i) the weighted average response time $\overline{Rt_{ij}}$ of Sg_i with respect to Sg_j, and ii) the weighted average throughput $\overline{Wkld_{ij}}$ of Sg_j with respect to Sg_j, divided by a sum of the overload correlations between Sg_i and each of the other competing storage groups in a set of competing storage groups that includes Sg_j.

FIG. 3 is a flow chart showing a second example of steps by which the disclosed system may generate an overload correlation between a target UMO and a competing UMO, where the overload correlation is a potential overload correlation. The steps of FIG. 3 may, for example, be performed by the UMO Performance Monitoring Logic 134 shown in FIG. 1. The steps of FIG. 3 may, for example, substitute for steps 204-208 in FIG. 2. In the example of FIG. 3, at step 300, as in step 204 of FIG. 2, a weighted average response time of the target UMO with respect to each one of the competing UMOs is calculated, where the weighted average response time of the target UMO with respect to a competing UMO is equal to the average response time of the target UMO weighted by the throughput of the competing UMO. At step 302 an overload correlation is calculated between the target UMO and each one of the competing UMOs equal to i) the weighted average response time for the target UMO with respect to the competing UMO, divided by ii) a sum of the overload correlations between the target UMO and all competing UMOs. Step 302 may then be followed by applying a performance control to one or more of the competing UMOs according to the overload correlations between the target UMO and the competing UMOs generated at step 302, until the average response time for the target UMO is within the acceptable range, as described above with reference to step 210 of FIG. 2.

FIG. 4 is a flow chart showing a third example of steps by which the disclosed system may generate an overload correlation between a target UMO and a competing UMO, where the overload correlation is a potential overload correlation. The steps of FIG. 4 may, for example, be performed by the UMO Performance Monitoring Logic 134 shown in FIG. 1 to selectively apply overload correlations generated according to the steps of FIG. 2 and/or FIG. 3.

At step 400, a self-weighted average response time of the target UMO is calculated that is equal to the average response time of the target UMO weighted by the throughput of the target UMO. Accordingly, for each one of the K time intervals, the average response time of the target UMO is multiplied by the throughput of the target UMO during the same time interval. The resulting K products are then added together, and that sum is then divided by a sum of the K throughputs of the target UMO in the K time intervals to generate the self-weighted average response time of the target UMO. In this way the self-weighted average response time for the target UMO is weighted by the throughput of the target UMO, to indicate how heavily influenced the average response time of the target UMO is by the throughput of the target UMO.

At step 402, the weighted average response time of the target UMO with respect to each competing UMO may be compared to the self-weighted response time for the target UMO. At step 404 performance controls are selectively applied relative to the self-weighted response time for the target UMO, performance controls are only applied to those competing UMOs for which the weighted average response time of the target UMO with respect to the competing UMO exceeds the self-weighted response time of the target UMO. In this way, the disclosed techniques may be embodied such that a performance control is advantageously only applied to a competing UMO when the influence of the throughput of the competing UMO on the average response time of the target UMO even considering the influence of the throughput of the target UMO on the average response time of the target UMO.

Figure 5:
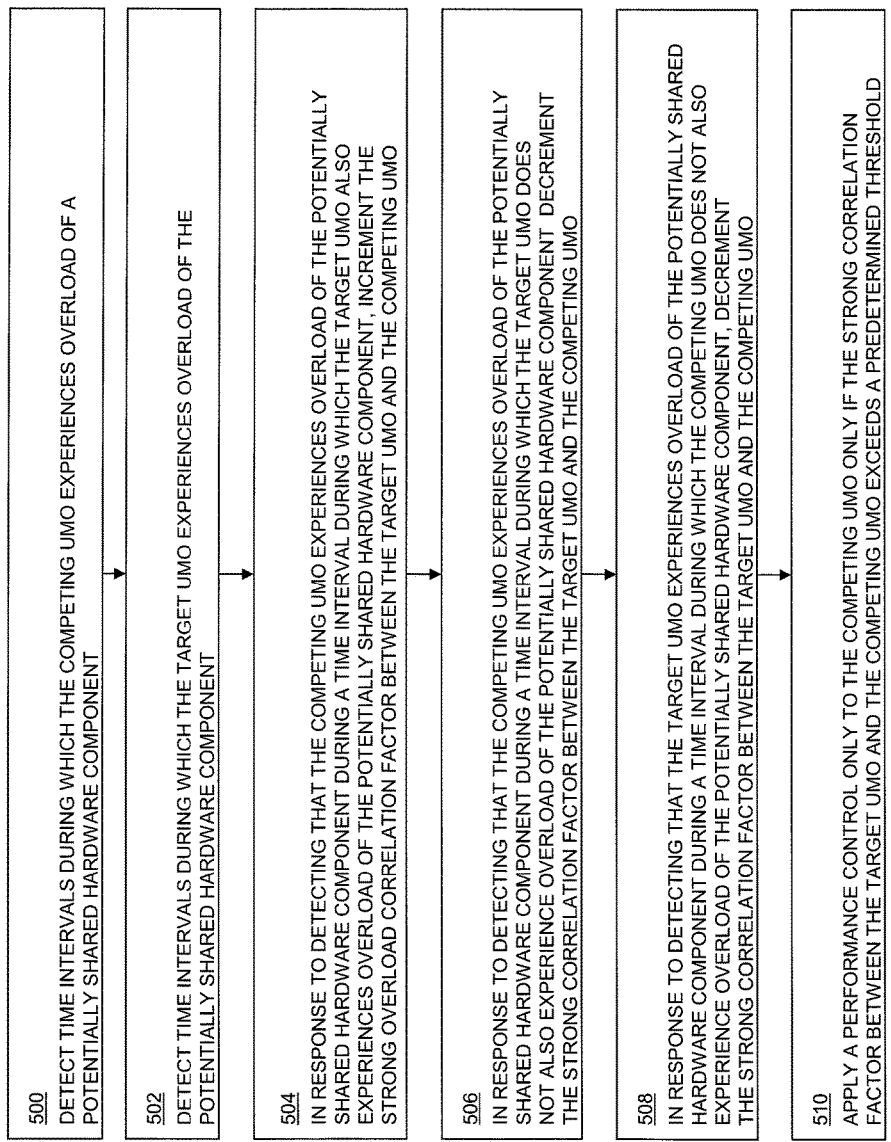
FIG. 5 is a flow chart showing an example of steps that may be performed by the disclosed system to generate a strong overload correlation factor.

FIG. 5 is a flow chart showing an example of steps that may be performed by the disclosed system to generate a strong overload correlation factor. The strong overload correlation factor generated by the steps in FIG. 5 between a target UMO and a competing UMO may also be used to selectively apply performance controls on competing UMOs, e.g. performance controls may only be applied to competing UMOs when the value of the strong overload correlation factor exceeds a predetermined minimum value. In this way the disclosed techniques may advantageously avoid unnecessarily applying performance controls on competing UMOs having throughputs that are not causing actual overload of a shared hardware resource that results in a negative impact on the target UMO average response time. While for purposes of explanation the steps of FIG. 5 describe maintaining a strong overload correlation factor between a target UMO and a single competing UMO, the strong correlation factor of the disclosed techniques may be generated between the target UMO and each one of multiple competing UMOs in a data storage system.

The strong overload correlation factor generated by the steps of FIG. 5 may be generated in configurations in which the presence of an actual hardware component overload can be confidently detected on the basis of the monitored performance indicator for a UMO, e.g. the average response time of a UMO. For example, when the array of non-volatile storage devices includes drives with a single level of response time performance, the disclosed techniques may determine that a UMO is experiencing an actual overload of a potentially shared hardware component when a measured response time of the UMO is greater than the maximum un-overloaded response time of the drives in the array of non-volatile storage devices. For example, in the case where only a single class of solid state drives are used within the array of non-volatile storage devices, the disclosed techniques may determine that a UMO is experiencing overload of a potentially shared hardware component in response to detecting that the measured average response time for the UMO is greater than a maximum un-overloaded response time of the solid state drives in the array of non-volatile storage devices. In the case of a configuration in which the array of non-volatile storage devices includes varied types of drives, with a variety of response times, then the disclosed system may determine that a UMO is experiencing overload of a drive in the array of non-volatile storage devices in response to detecting that the UMO has a measured average response time that is greater than a maximum un-overloaded response time of the lowest performing type of drive in the array of non-volatile storage devices.

The steps of FIG. 5 may, for example, be performed by the UMO Performance Monitoring Logic 134 (FIG. 1).

At step 500, time intervals are detected during which the competing UMO experiences overload of a hardware component that is potentially shared between the competing UMO and the target UMO. For example, time intervals during which the average response time of the competing UMO exceeds some predetermined number of milliseconds (e.g. 4 milliseconds) that equals a maximum un-overloaded maximum response time for a potentially shared hardware resource may be determined to be time intervals during which the competing UMO experiences overload of a potentially shared hardware component. At step 502, time intervals are detected during which the target UMO experiences overload of the potentially shared hardware component. Similarly as with determination performed for the competing UMO at step 500, time intervals during which the average response time of the target UMO exceeds the predetermined number of milliseconds may be determined at step 502 to be time intervals during which the target UMO experiences overload of a potentially shared hardware component.

At step 504, in response to detecting that the competing UMO experiences overload of the potentially shared hardware component during a time interval during which the target UMO also experiences overload of the potentially shared hardware component, the strong overload correlation factor between the target UMO and the competing UMO is incremented. The amount that the strong overload correlation factor between the target UMO and the competing UMO is incremented at step 504 may, for example, be a value calculated based on the cumulative amount by which the average response time of the target UMO and the average response time of the competing UMO exceed the predetermined number of milliseconds, with larger increments being applied for larger cumulative amounts.

At step 506, in response to detecting that the competing UMO experiences overload of the potentially shared hardware component in a time interval during which the target UMO does not also experience overload of the potentially shared hardware component, the strong correlation factor between the target UMO and the competing UMO is decremented. The amount that the strong overload correlation factor between the target UMO and the competing UMO is decremented at step 506 may, for example, be a value calculated based on the cumulative amount by which the average response time of the target UMO is less than the predetermined number of milliseconds, and by which the average response time of the competing UMO exceeds the predetermined number of milliseconds, with larger increments being applied for larger cumulative amounts.

At step 508, in response to detecting that the target UMO experiences overload of the potentially shared hardware component in a time interval during which the competing UMO does not also experience overload of the potentially shared hardware component, the strong correlation factor between the target UMO and the competing UMO is decremented. The amount that the strong overload correlation factor between the target UMO and the competing UMO is decremented may, for example, be a value calculated based on the cumulative amount by which the average response time of the competing UMO is less than the predetermined number of milliseconds, and by which the average response time of the target UMO exceeds the predetermined number of milliseconds, with larger increments being applied for larger cumulative amounts.

At step 510, the strong overload correlation factor between the target UMO and each competing UMO may be used to control application of performance controls to the competing UMOs when a current level of the performance indicator for the target UMO is outside the acceptable range. For example, at step 510 performance controls may be applied to competing UMOs only when the strong overload correlation factor between the target UMO and a competing UMO exceeds a predetermined minimum threshold, e.g. a positive value, since a positive strong overload correlation only arises when the target and competing UMO both experience known overload conditions at the same time.

The techniques for generating an overload correlation between a target UMO and a competing UMO described above with reference to FIGS. 2-3, and for selectively applying performance controls described above with reference to FIGS. 4-5, may be applied in various combinations and permutations until the level of the performance indicator for the target UMO is brought within the acceptable range for the target UMO, while applying a minimal amount of performance controls. It is desirable to bring the performance indicator for the target UMO within the acceptable range while applying the fewest number of performance controls, so that the impact on the performance of competing UMOs is minimized. Accordingly, if performing a first permutation of one or more of the above described techniques results in a set of overload correlations that does not bring the level of the performance indicator for the target UMO within the acceptable range, a second permutation may be performed, and so on, until the level of the performance indicator is brought within the acceptable range. Similarly, different permutations of the above described techniques may be performed until a permutation is determined that brings the performance indicator for the target UMO within the acceptable range while applying the fewest number of performance controls of all permutations.

For example, one or more performance controls may initially be selectively applied to one or more competing UMOs selected per the techniques described above with reference to FIG. 4 and/or FIG. 5. If initially applying performance controls to a set of competing UMOs selected based on the techniques described above with reference to FIG. 4 and/or FIG. 5 fails to bring the performance indicator for the target UMO within the acceptable range, then the less selective techniques described above with reference to FIG. 2 and/or FIG. 3 may be applied in order to identify additional competing UMOs on which to also or alternatively apply performance controls.

In another example, competing UMOs may be organized into an ordered list based at least on the overload correlations between the target UMO and the competing UMOs. A performance control may first be applied to only a subset of the competing UMOs having the highest values of such overload correlations, e.g. only a predetermined percentage or fixed number of highest ranked competing UMOs based on overload correlation values. If the performance indicator is not brought within the acceptable range as a result, performance controls may be applied to a larger subset of the competing UMOs with highest relative values of overload correlations, e.g. a higher percentage or higher number of competing UMOs, and so on until the performance indicator is brought within the acceptable range. In general, at a given point in time, multiple ones of the techniques disclosed herein may be used to determine which competing UMOs are to be selected for application of performance controls. To respond quickly, embodiments of the disclosed techniques may operate to find a minimum number of competing UMOs to act upon, and may also use multiple ones of the disclosed correlation overload measures to determine a desired number of candidate competing UMOs from which to select the competing UMOs on which performance controls are to be applied.

The disclosed techniques may further be embodied so that a competing UMO is selected for application of a performance control based not only on the value of the overload correlation and/or strong correlation factor between the target UMO and the competing UMO, but also based on a priority level of the competing UMO, and/or on whether the competing UMO has a measured throughput that exceeds a guaranteed amount of throughput that is provisioned to the competing UMO. Accordingly, in one example, performance controls may initially be applied only to an initial set of competing UMOs that have the lowest priority of the competing UMOs, and/or that also have a measured throughput that exceeds their guaranteed amount of throughput by some initial minimum amount. If applying performance controls to the initial set of competing UMOs does not bring the level of the performance indicator for the target UMO within the acceptable range for the target UMO, then additional performance controls may be applied to other competing UMOs having higher priorities, and/or having measured throughputs that exceed their guaranteed amount of throughput by amounts less than the initial minimum amount.

For example, in one embodiment, the disclosed techniques may be embodied so that the competing UMOs are organized into a sorted list, where the list of competing UMOs is sorted for purposes of applying performance controls based on the following: i) an amount by which a throughput of each competing UMO exceeds a guaranteed amount of throughput, ii) a size of the overload correlation between the target UMO and each competing UMO, and/or iii) a priority level of each competing UMO. The resulting sorted list of competing UMOs places competing UMOs relatively closer to the top of the list that i) exceed their guaranteed amount of throughput by relatively larger amounts, ii) have relatively larger sizes of overload correlation between the target UMO and the competing UMO, and/or iii) have lower priority levels. The sorted list of competing UMOs may then be divided into "bands" of competing UMOs, e.g. the first band including the top N competing UMOs, the second band including the next highest N competing UMOs, and so on. Starting with the top band, the disclosed techniques may then apply performance controls to successively greater numbers of bands until the performance indicator for the target UMO is brought within the acceptable range. For example, performance controls may first be applied to the competing UMOs in the first band. If the performance indicator for the target UMO is still not within the acceptable range after applying performance controls to the competing UMOs in the first band, then performance controls may additionally be applied to the competing UMOs in the second band, and so on until the performance indicator for the target UMO is within the acceptable range. The amount of throughput reduction performed on a competing UMO by each performance control may, for example, be determined as an amount that is equal to a predetermined percentage of the total, cumulative amount of throughput by which the competing UMOs in the complete set of competing UMOs exceed their respective guaranteed amounts of throughput, or in some other way.

Figure 6:
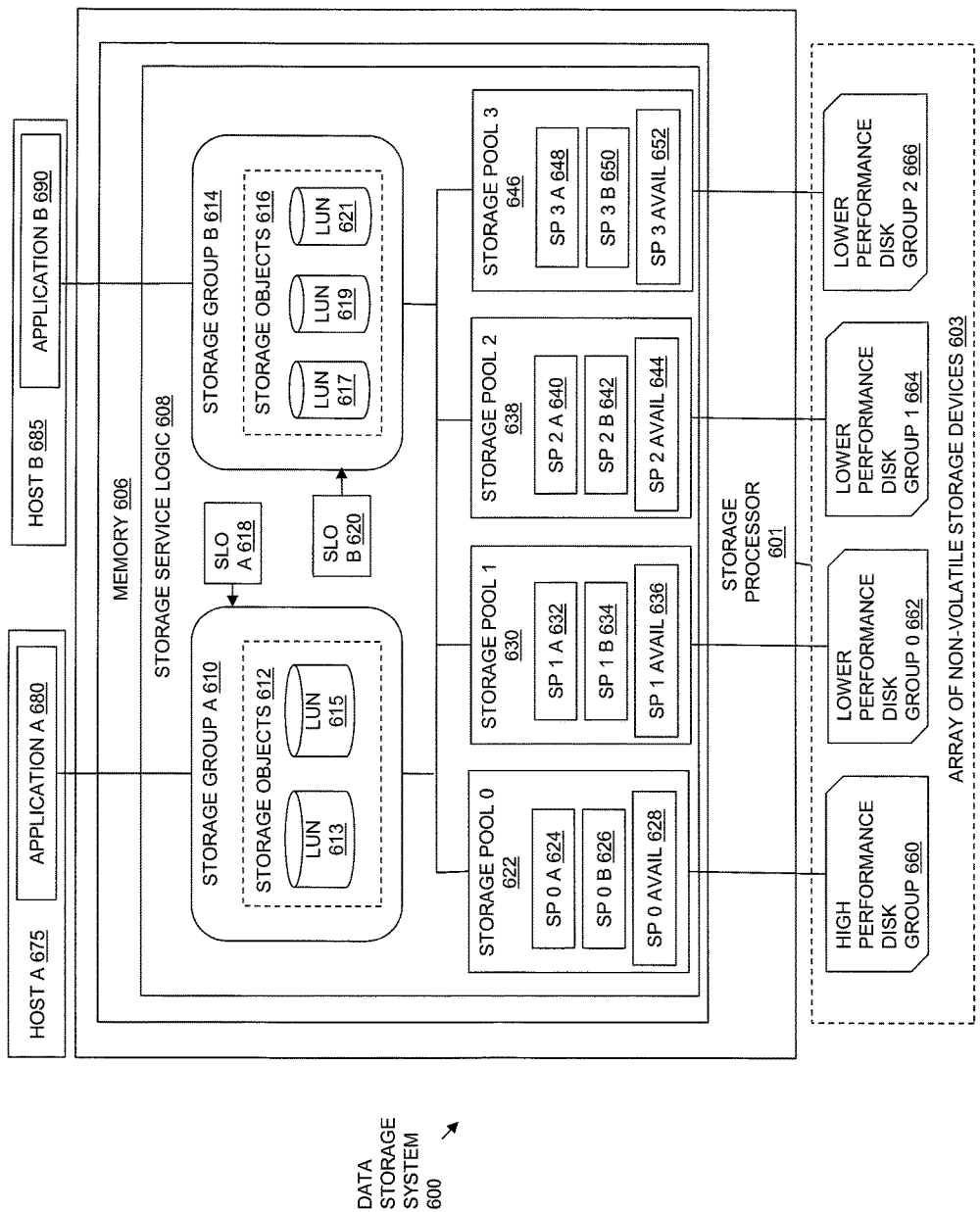
FIG. 6 is a block diagram showing an example of units of managed storage objects that are storage groups, and showing potentially shared hardware components that are drives having different levels of performance.

FIG. 6 is a block diagram showing an example of UMOs that are storage groups, and showing potentially shared hardware components that are storage drives having different levels of performance. As shown in the example of FIG. 6, host computing devices Host A 675 and Host B 685 include host applications executing thereon, e.g. Application A 680 executing on Host A 675 and Application B 690 executing on Host B 685. Host A 675 and Host B 685 access data storage provided by Data Storage System 600. Data Storage System 600 includes at least one Storage Processor 601 and Array of Non-Volatile Storage Devices 603. In the example of FIG. 6, the Array of Non-Volatile Storage Devices 603 organizes different types of non-volatile storage devices by the level of performance they provide, e.g. in terms of response time. High Performance Disk Group 660 is made up of some number of high performance non-volatile storage devices, such as one or more solid state drives, e.g. enterprise flash drives (e.g. enterprise multi-level cell (eMLC) flash memory). The lower performance disk groups shown by Lower Performance Disk Group 0 662, Lower Performance Disk Group 1 664, and Lower Performance Disk Group 2 666, are each made up of non-volatile storage devices having lower performance than the non-volatile storage devices in High Performance Disk Group 660. For example, the non-volatile storage devices in the lower performance disk groups may consist of a number of magnetic hard disk drives. Each of Lower Performance Disk Group 0 162, Lower Performance Disk Group 1 164, and Lower Performance Disk Group 2 166 may contain non-volatile storage having a different level of performance (e.g. hard disk drives having different rotational speeds).

Memory 606 includes Storage Service Logic 608, which is an example of Storage Service Logic 130 shown in FIG. 1. Storage Group A 610 and Storage Group B 614 are examples of UMOs in UMOs 132 shown in FIG. 1. While for purposes of concise illustration, only two storage groups are shown in FIG. 6, the disclosed system is not limited in this regard, and any specific number of storage groups may be provided. Memory 606 may also include Quality of Service (QoS) software, such as the QoS Controller Logic 140 described above with reference to FIG. 1. Both Storage Service Logic 608 and the QoS software may execute on processing circuitry contained in Storage Processor 101, such as the Processing Circuitry 102 described above with reference to FIG. 1.

Storage Service Logic 608 provides data storage for use by one or more applications to store data. For example, Storage Service Logic 608 provides Storage Objects 612 in Storage Group A 610 to store data that is generated and/or used by Application A 680. The Storage Objects 612 in Storage Group A 110 may, for example, include some number of LUNs, shown by LUN 613 and LUN 615. Storage Service Logic 608 also provides Storage Objects 616 in Storage Group B 614 to store data that is generated and/or used by Application B 690. The Storage Objects 616 in Storage Group B 614 may, for example, also include some number of logical disks, shown by LUN 617, LUN 619 and LUN 621. Storage Objects 612 and Storage Objects 616 are provided by Storage Service Logic 108 using units of storage allocated from the Array of Non-Volatile Storage Devices 603.

Those skilled in the art will recognize that while the storage objects in the example of FIG. 6 are shown for purposes of illustration and explanation as LUNs, the disclosed techniques are not limited to use with LUNs. Alternatively, or in addition, the disclosed techniques may be applied to other types of storage objects that may be provided by the Storage Processor 601 to store data on behalf of one or more applications, such as host file systems, and/or VVols (virtual volumes, such as a virtual machine disk, e.g., as available from VMware, Inc. of Palo Alto, Calif.).

The drives in each one of the disk groups in Array of Non-Volatile Storage Devices 603 are examples of hardware components that are potentially shared between Storage Group A 610 and Storage Group B 614. When storage resources are allocated from an individual drive in any one of the disk groups to storage objects in both Storage Group A 610 and Storage Group B 614, this results in the drive being actually shared between Storage Group A 610 and Storage Group B 614. In the example of FIG. 6, Storage Service Logic 608 uses Storage Pool 0 622, Storage Pool 1 630, Storage Pool 2 638, and Storage Pool 3 646 to allocate storage resources (e.g. extents) from the disk groups 660, 662, 664, and 666 to the Storage Objects 612 in Storage Group A 610 and to the Storage Objects 616 in Storage Group B 614. Each storage pool includes indications of the organization and/or amounts or sizes of the allocated and unallocated units of storage managed by the storage pool, as well as indications (e.g. locations) of units of storage in the non-volatile storage devices in the respective physical disk group that are currently allocated to storing host data in specific storage objects, and/or that are free and currently unallocated but available for allocation. In the example of FIG. 6, Storage Pool 0 622 includes indications of the units of storage allocated from High Performance Disk Group 660 to Storage Objects 612 in Storage Group A 610, shown by SP 0 A 624, indications of the units of storage allocated from High Performance Disk Group 660 to Storage Objects 616 in Storage Group B 614, shown by SP 0 B 626, and indications of units of storage in High Performance Disk Group 660 that are available for allocation to either Storage Objects 612 in Storage Group A 610 or Storage Objects 616 in Storage Group B 614, shown by SP 0 AVAIL 628. In the case where SP 0 A 624 and SP 0 B 626 are allocated from the same drive in High Performance Disk Group 660, that drive is actually shared between Storage Group A 610 and Storage Group B 614.

Storage Pool 1 630 includes indications of units of storage allocated from Lower Performance Disk Group 0 662 to Storage Objects 612 in Storage Group A 610, shown by SP 1 A 632, indications of units of storage allocated from Lower Performance Disk Group 0 662 to Storage Objects 616 in Storage Group B 614, shown by SP 1 B 634, and indications of units of storage in Lower Performance Disk Group 0 662 that are available for allocation to either Storage Objects 612 in Storage Group A 610 or Storage Objects 616 in Storage Group B 614, shown by SP 1 AVAIL 636. In the case where SP 1 A 632 and SP 1 B 634 are allocated from the same drive in Lower Performance Disk Group 0 662, that drive is actually shared between Storage Group A 610 and Storage Group B 614.

Storage Pool 2 638 includes indications of units of storage allocated from Lower Performance Disk Group 1 664 to Storage Objects 612 in Storage Group A 610, shown by SP 2 A 640, indications of units of storage allocated from Lower Performance Disk Group 1 664 to Storage Objects 616 in Storage Group B 614, shown by SP 2 B 642, and indications of units of storage in Lower Performance Disk Group 1 664 that are available for allocation to either Storage Objects 612 in Storage Group A 610 or Storage Objects 616 in Storage Group B 614, shown by SP 2 AVAIL 644. In the case where SP 2 A 640 and SP 2 B 642 are allocated from the same drive in Lower Performance Disk Group 1 664, that drive is actually shared between Storage Group A 610 and Storage Group B 614.

Storage Pool 3 646 includes indications of units of storage allocated from Lower Performance Disk Group 2 666 to Storage Objects 612 in Storage Group A 610, shown by SP 3 A 648, indications of units of storage allocated from Lower Performance Disk Group 2 666 to Storage Objects 616 in Storage Group B 614, shown by SP 3 B 650, and indications of units of storage in Lower Performance Disk Group 2 666 that are available for allocation to either Storage Objects 612 in Storage Group A 610 or Storage Objects 616 in Storage Group B 614, shown by SP 3 AVAIL 650. In the case where SP 3 A 648 and SP 3 B 650 are allocated from the same drive in Lower Performance Disk Group 2 666, that drive is actually shared between Storage Group A 610 and Storage Group B 614.

Storage Group A 610 and Storage Group B 614 each have an associated service level objective (SLO) that indicates an acceptable range of average response times for I/O operations performed on the storage objects within the storage group. Specifically, Storage Group A 610 is associated with SLO A 618, and SLO A 618 indicates an acceptable range of average response times for I/O operations performed by Application A 680 on Storage Objects 612. Storage Group B 614 is associated with SLO B 620, and SLO B 620 indicates an acceptable range of average response times for I/O operations performed by Application B 690 on Storage Objects 616.

Storage Processor 601 monitors the I/O operations performed by Application A 680 on Storage Objects 612, in order to detect when a response time for Storage Group A 110 is outside its acceptable range, e.g. when the average response time for I/O operations directed to Storage Objects 612 exceeds SLO A 618. Similarly, Storage Processor 601 monitors the I/O operations performed by Application B 690 on Storage Objects 616, in order to detect when a response time for Storage Group B 614 is outside its acceptable range, e.g. when the average response time for I/O operations directed to Storage Objects 616 exceeds SLO B 620. Storage Processor 601 may also detect a time at which Storage Group A 610 or Storage Group B 614 is experiencing an actual overload of a drive in Array of Non-Volatile Storage Devices 603 by determining that the response time of Storage Group A 610 or Storage Group B 614 is greater than a maximum un-overloaded response time of the lowest performing type of drive in Array of Non-Volatile Storage Devices 603. For example, in a configuration in which High Performance Disk Group 660 is made up of solid state drives, Lower Performance Disk Group 0 662 is made up of hard disk drives having a disk rotational speed of fifteen thousand revolutions per minute (RPM), Lower Performance Disk Group 1 664 is made up of hard disk drives having a disk rotational speed of ten thousand revolutions per minute, and Lower Performance Disk Group 2 666 is made up of hard disk drives having a disk rotational speed of seven thousand two hundred revolutions per minute, the lowest performing type of drive is the hard disk drives in Lower Performance Disk Group 2 666. Accordingly, the disclosed techniques will detect that Storage Group A 610 is experiencing an actual overload of a drive in Array of Non-Volatile Storage Devices 603 by determining that the response time of Storage Group A 610 is greater than a maximum un-overloaded response time of the hard disk drives in Lower Performance Disk Group 2 666. Similarly, the disclosed techniques will detect that Storage Group B 614 is experiencing an actual overload of a drive in Array of Non-Volatile Storage Devices 603 by determining that the response time of Storage Group B 614 is greater than a maximum un-overloaded response time of the hard disk drives in Lower Performance Disk Group 2 666.

Such monitoring to determine whether one or both of Storage Group A 610 or Storage Group B 614 has a response time greater than its corresponding SLO, and/or to detect when one or both of Storage Group A 610 or Storage Group B 614 is experiencing an actual overload of a potentially shared hardware component may, for example, be performed by Quality of Service (QoS) software executing in Storage Processor 601, such as the QoS Controller Logic 140 described above with reference to FIG. 1.

Figure 7:
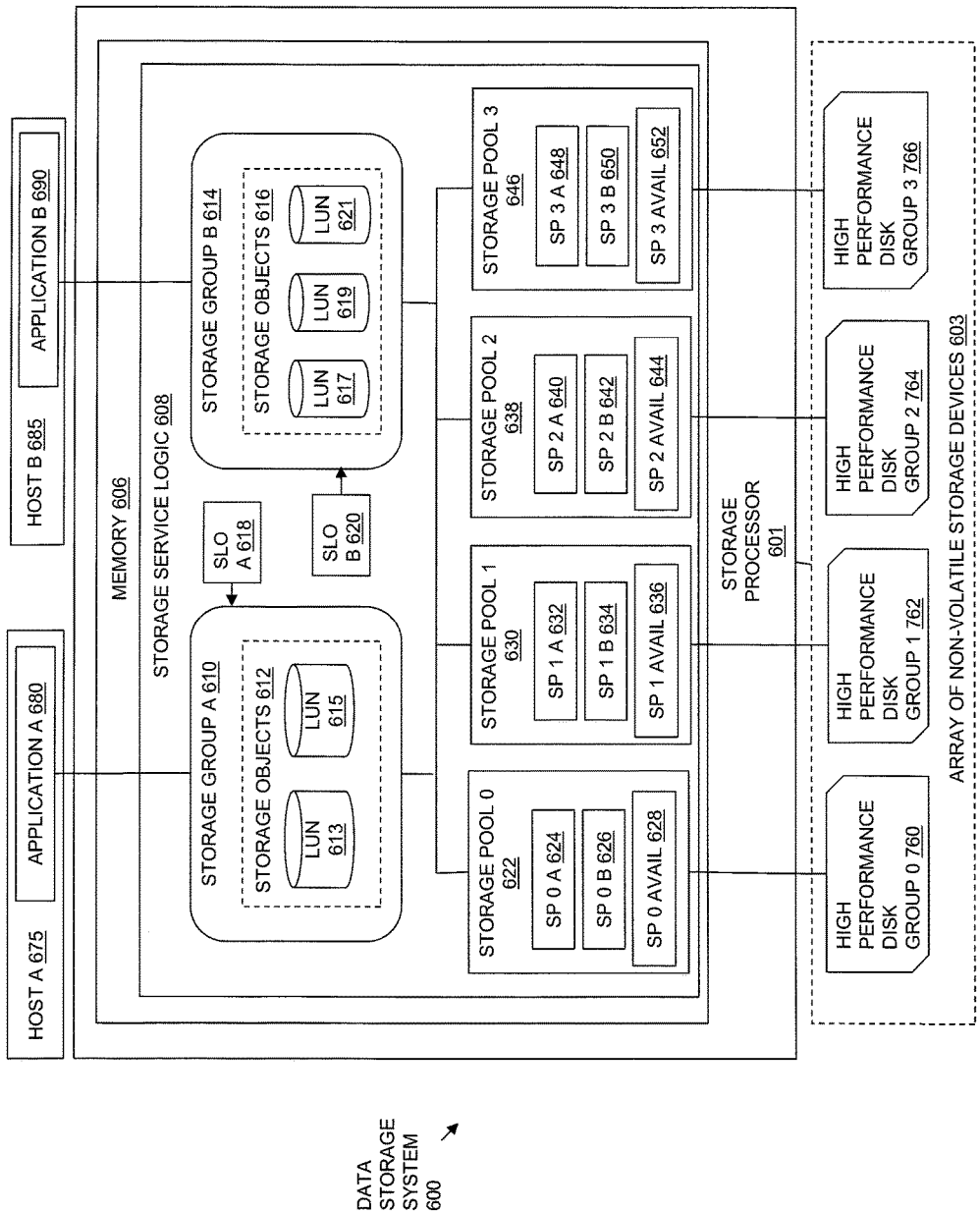
FIG. 7 is a block diagram showing an example of units of managed storage objects that are storage groups, and showing potentially shared hardware components that are drives having a single level of performance.

FIG. 7 is a block diagram showing an example of the Data Storage System 600 alternatively configured with drives having a single level of performance. In the example of FIG. 7, only a single class of solid state drives is used within the Array of Non-volatile Storage Devices 603. Accordingly, each of the disk groups is a high performance disk group, as shown by High Performance Disk Group 0 760, High Performance Disk Group 1 762, High Performance Disk Group 2 764, and High Performance Disk Group 3 766. For example, High Performance Disk Group 0 760, High Performance Disk Group 1 762, High Performance Disk Group 2 764, and High Performance Disk Group 3 766 may each consist of one or more solid state drives, such as enterprise flash drives (e.g. enterprise multi-level cell (eMLC) flash memory). In a configuration such as the one shown in FIG. 7, the disclosed techniques may determine that a given UMO is experiencing actual overload of a potentially shared hardware component in response to detecting that the measured average response time for the UMO is greater than a maximum un-overloaded response time of the solid state drives in High Performance Disk Group 0 760, High Performance Disk Group 1 762, High Performance Disk Group 2 764, and High Performance Disk Group 3 766. Accordingly, the disclosed techniques may detect that Storage Group A 610 is experiencing an actual overload of a drive in Array of Non-Volatile Storage Devices 603 by determining that the response time of Storage Group A 610 is greater than a maximum un-overloaded response time of the solid state drives in High Performance Disk Group 0 760, High Performance Disk Group 1 762, High Performance Disk Group 2 764, and High Performance Disk Group 3 766. Similarly, the disclosed techniques will detect that Storage Group B 614 is experiencing an actual overload of a drive in Array of Non-Volatile Storage Devices 603 by determining that the response time of Storage Group B 614 is greater than a maximum un-overloaded response time of the solid state drives in High Performance Disk Group 0 760, High Performance Disk Group 1 762, High Performance Disk Group 2 764, and High Performance Disk Group 3 766.

Figure 8:
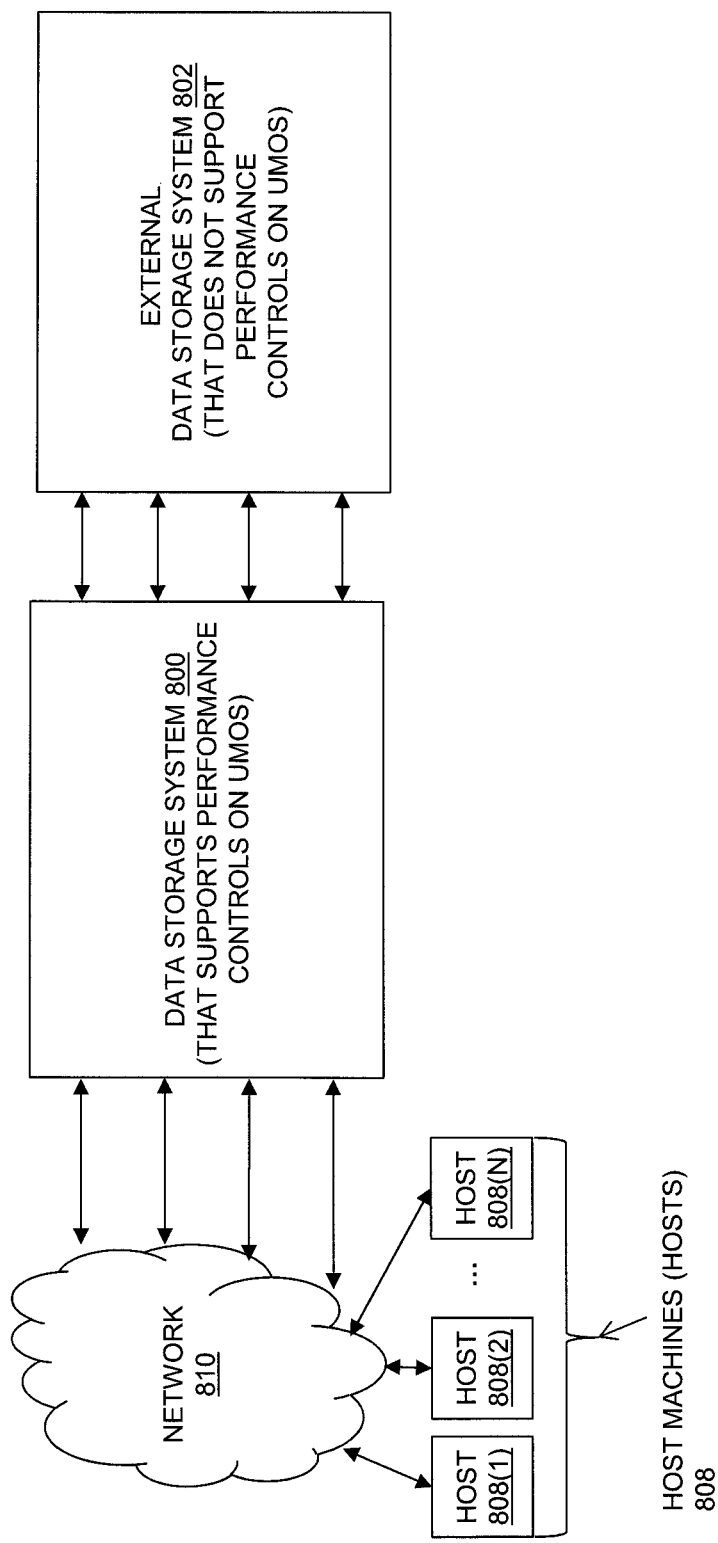
FIG. 8 is a block diagram showing an example configuration in which a data storage system that supports performance controls on units of managed storage objects for quality of service is coupled to an external data storage system that provides back end data storage resources, but does not support performance controls to provide quality of service.

FIG. 8 is a block diagram showing an example configuration in which a Data Storage System 800 that supports performance controls on UMOs for quality of service is coupled to an External Data Storage System 802 that provides back end data storage resources, but does not support performance controls to provide quality of service. In the configuration shown in FIG. 8, Hosts 808 (e.g. Host 808(1) through Host 808(N)) access UMOs served by Data Storage System 800, for example over one or more computer networks, shown by Network 810. Data Storage System 800 processes host I/O operations, e.g. I/O read and I/O write operations that are received from Hosts 808 over Network 810. The host data stored in the storage objects of the UMOs served by Data Storage System 800 is ultimately stored by Data Storage System 800 in units of storage allocated by External Data Storage System 802 from non-volatile storage devices within External Data Storage System 802. However, Data Storage System 800 has no visibility into External Data Storage System 802, e.g. with regard to hardware components that may potentially be shared between different UMOs served by Data Storage System 800 to Hosts 808. In addition, External Data Storage System 802 may have no capability with regard to applying performance controls to address problems of overloading of the shared hardware components that are contained within External Data Storage System 802. Accordingly, in a configuration such as the one shown in FIG. 8, the hardware components that may potentially be shared between a target UMO and a competing UMO may include or consist of one or more hardware components contained within External Data Storage System 802, where External Data Storage System 802 provides units of storage from non-volatile storage devices contained within External Data Storage System 802, that are used to persistently store host data indicated by host I/O operations that are directed to the target UMO and the competing UMO.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, it should be understood that some data storage systems may be configured to run host applications locally, i.e., in the memory of the storage processor.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of applying performance controls in a data storage system based on overload correlations between units of managed storage objects (UMOs), comprising:
   detecting that a performance indicator for a target UMO is outside an acceptable range; and
   in response to detecting that the performance indicator for the target UMO is outside the acceptable range,
   i) generating an overload correlation between the target UMO and each competing UMO in a set of competing UMOs, wherein each competing UMO potentially shares at least one hardware component with the target UMO, wherein the overload correlation between the target UMO and each competing UMO indicates an amount of correlation between the performance indicator for the target UMO and a performance indicator for the competing UMO, and
   ii) applying a performance control to the throughput of at least one of the competing UMOs responsive to the overload correlations between the target UMO and the competing UMOs, wherein applying the performance control reduces the throughput of the competing UMO by an amount that is based on the size of the overload correlation between the target UMO and the competing UMO, to bring the performance indicator for the target UMO within the acceptable range.

2. The method of claim 1, wherein the performance indicator for the competing UMO comprises a throughput of the competing UMO; and
   wherein the throughput of the competing UMO comprises a rate at which host I/O operations directed to at least one storage object in the competing UMO are processed by the data storage system.

3. The method of claim 2, wherein the performance indicator for the target UMO comprises an average response time of the target UMO, wherein the average response time of the target UMO is an average response time for processing host I/O operations directed to the target UMO; and
   wherein generating the overload correlation between the target UMO and each competing UMO comprises a) calculating a weighted average response time of the target UMO with respect to each competing UMO equal to the average response time of the target UMO weighted by the throughput of the competing UMO;
b) calculating a weighted average throughput of the target UMO with respect to each competing UMO equal to an average throughput of the target UMO weighted by the throughput of the competing UMO; and
c) generating the overload correlation between the target UMO and each competing UMO as a value equal to i) a product of the weighted average response time of the target UMO with respect to the competing UMO multiplied by the weighted average throughput of the target UMO with respect to the competing UMO, divided by ii) a sum of the overload correlations between the target UMO and all competing UMOs in the set of competing UMOs.

4. The method of claim 2, wherein the performance indicator for the target UMO comprises an average response time of the target UMO, wherein the average response time of the target UMO is an average response time for processing host I/O operations directed to the target UMO; and
wherein generating the overload correlation between the target UMO and each competing UMO comprises
a) calculating a weighted average response time of the target UMO with respect to each competing UMO equal to the average response time of the target UMO weighted by the throughput of the competing UMO; and
b) generating the overload correlation between the target UMO and each competing UMO as a value equal to i) the weighted average response time of the target UMO with respect to the competing UMO, divided by ii) a sum of the overload correlations between the target UMO and all competing UMOs in the set of competing UMOs.

5. The method of claim 3, further comprising:
calculating a self-weighted average response time of the target UMO equal to the average response time of the target UMO weighted by the average throughput of the target UMO;
comparing the weighted average response time of the target UMO with respect to each competing UMO to the self-weighted response time of the target UMO; and
applying performance controls only to those competing UMOs for which the weighted average response time of the target UMO with respect to the competing UMO exceeds the self-weighted response time of the target UMO.

6. The method of claim 1, further comprising:
generating a strong overload correlation factor between the target UMO and each competing UMO by
a) detecting time intervals during which the competing UMO experiences overload of the potentially shared hardware component,
b) detecting time intervals during which the target UMO experiences overload of the potentially shared hardware component,
c) in response to detecting that the competing UMO experiences overload of the potentially shared hardware component during a time interval during which the target UMO also experiences overload of the potentially shared hardware component, incrementing the strong overload correlation factor between the target UMO and the competing UMO,
d) in response to detecting that the competing UMO experiences overload of the potentially shared hardware component during a time interval during which the target UMO does not also experience overload of the potentially shared hardware component, decrementing the strong correlation factor between the target UMO and the competing UMO,
e) in response to detecting that the target UMO experiences overload of the potentially shared hardware component during a time interval during which the competing UMO does not also experience overload of the potentially shared hardware component, decrementing the strong correlation factor between the target UMO and the competing UMO; and
applying performance controls only to those of the competing UMOs for which the strong correlation factor between the target UMO and the competing UMO exceeds a predetermined threshold.

7. The method of claim 6, wherein each UMO comprises a storage group including one or more storage objects;
wherein the at least one hardware component potentially shared between the target UMO and each competing UMO comprises a plurality of storage drives having different levels of performance;
wherein detecting time intervals during which the competing UMO experiences overload of the potentially shared hardware component comprises detecting time intervals during which the competing UMO has an average response time that is greater than a maximum un-overloaded response time of a lowest performing type of storage drive in the plurality of storage drives; and
wherein detecting time intervals during which the target UMO experiences overload of the potentially shared hardware component comprises detecting time intervals during which the target UMO has an average response time that is greater than the maximum un-overloaded response time of the lowest performing type of storage drive in the plurality of storage drives.

8. The method of claim 6, wherein each UMO comprises a storage group including one or more storage objects;
wherein the at least one hardware component potentially shared between the target UMO and each competing UMO comprises a plurality of storage drives having a single level of performance;
wherein detecting time intervals during which the competing UMO experiences overload of the potentially shared hardware component comprises detecting time intervals during which the competing UMO has an average response time that is greater than a maximum un-overloaded response time of the storage drives in the plurality of storage drives; and
wherein detecting time intervals during which the target UMO experiences overload of the potentially shared hardware component comprises detecting time intervals during which the target UMO has an average response time that is greater than the maximum un-overloaded response time of the storage drives in the plurality of storage drives.

9. The method of claim 1, wherein the at least one hardware component potentially shared between the target UMO and each competing UMO comprises one or more hardware components contained within an external data storage system, wherein the external data storage system is communicably coupled to the data storage system and provides units of storage from non-volatile storage devices contained within the external data storage system that are used to persistently store host data indicated by host I/O operations received by the data storage system that are directed to the target UMO and the competing UMOs.

10. A data storage system, comprising:
processing circuitry;
a memory coupled to the processing circuitry, the memory storing program code for applying performance controls in the data storage system based on overload correlations between units of managed storage objects (UMOs) which, when executed by the processing circuitry, causes the processing circuitry to:
detect that a performance indicator for a target UMO is outside an acceptable range, and
in response to detecting that the performance indicator for the target UMO is outside the acceptable range,
i) generate an overload correlation between the target UMO and each competing UMO in a set of competing UMOs, wherein each competing UMO potentially shares at least one hardware component with the target UMO, wherein the overload correlation between the target UMO and each competing UMO indicates an amount of correlation between the performance indicator for the target UMO and a performance indicator for the competing UMO, and
ii) apply a performance control to the throughput of at least one of the competing UMOs responsive to the overload correlations between the target UMO and the competing UMOs, wherein applying the performance control reduces the throughput of the competing UMO by an amount that is based on the size of the overload correlation between the target UMO and the competing UMO to bring the performance indicator for the target UMO within the acceptable range.

11. The data storage system of claim 10, wherein the performance indicator for the competing UMO comprises a throughput of the competing UMO; and
wherein the throughput of the competing UMO comprises a rate at which host I/O operations directed to at least one storage object in the competing UMO are processed by the data storage system.

12. The data storage system of claim 11, wherein the performance indicator for the target UMO comprises an average response time of the target UMO;
wherein the average response time of the target UMO is an average response time for processing host I/O operations directed to the target UMO; and
wherein the program code, when executed by the processing circuitry, further causes the processing circuitry to generate the overload correlation between the target UMO and each competing UMO by
a) calculating a weighted average response time of the target UMO with respect to each competing UMO equal to the average response time of the target UMO weighted by the throughput of the competing UMO,
b) calculating a weighted average throughput of the target UMO with respect to each competing UMO equal to an average throughput of the target UMO weighted by the throughput of the competing UMO, and
c) generating the overload correlation between the target UMO and each competing UMO as a value equal to i) a product of the weighted average response time of the target UMO with respect to the competing UMO multiplied by the weighted average throughput of the target UMO with respect to the competing UMO, divided by ii) a sum of the overload correlations between the target UMO and all competing UMOs in the set of competing UMOs.

13. The data storage system of claim 11, wherein the performance indicator for the target UMO comprises an average response time of the target UMO;
wherein the average response time of the target UMO is an average response time for processing host I/O operations directed to the target UMO; and
wherein the program code, when executed by the processing circuitry, further causes the processing circuitry to generate the overload correlation between the target UMO and each competing UMO by
a) calculating a weighted average response time of the target UMO with respect to each competing UMO equal to the average response time of the target UMO weighted by the throughput of the competing UMO, and
b) generating the overload correlation between the target UMO and each competing UMO as a value equal to i) the weighted average response time of the target UMO with respect to the competing UMO, divided by ii) a sum of the overload correlations between the target UMO and all competing UMOs in the set of competing UMOs.

14. The data storage system of claim 12, wherein the program code, when executed by the processing circuitry, further causes the processing circuitry to:
calculate a self-weighted average response time of the target UMO equal to the average response time of the target UMO weighted by the average throughput of the target UMO;
compare the weighted average response time of the target UMO with respect to each competing UMO to the self-weighted response time of the target UMO; and
apply performance controls only to those competing UMOs for which the weighted average response time of the target UMO with respect to the competing UMO exceeds the self-weighted response time of the target UMO.

15. The data storage system of claim 10, wherein the program code, when executed by the processing circuitry, further causes the processing circuitry to:
generate a strong overload correlation factor between the target UMO and each competing UMO by
a) detecting time intervals during which the competing UMO experiences overload of the potentially shared hardware component,
b) detecting time intervals during which the target UMO experiences overload of the potentially shared hardware component,
c) in response to detecting that the competing UMO experiences overload of the potentially shared hardware component during a time interval during which the target UMO also experiences overload of the potentially shared hardware component, incrementing the strong overload correlation factor between the target UMO and the competing UMO,
d) in response to detecting that the competing UMO experiences overload of the potentially shared hardware component during a time interval during which the target UMO does not also experience overload of the potentially shared hardware component, decrementing the strong correlation factor between the target UMO and the competing UMO,
e) in response to detecting that the target UMO experiences overload of the potentially shared hardware component during a time interval during which the competing UMO does not also experience overload of the potentially shared hardware component, decrementing the strong correlation factor between the target UMO and the competing UMO; and apply performance controls only to those of the competing UMOs for which the strong correlation factor between the target UMO and the competing UMO exceeds a predetermined threshold.

16. The data storage system method of claim 15, wherein each UMO comprises a storage group including one or more storage objects;

wherein the at least one hardware component potentially shared between the target UMO and each competing UMO comprises a plurality of storage drives having different levels of performance; and wherein the program code, when executed by the processing circuitry, further causes the processing circuitry to detect time intervals during which the competing UMO experiences overload of the potentially shared hardware component by detecting time intervals during which the competing UMO has an average response time that is greater than a maximum un-overloaded response time of a lowest performing type of storage drive in the plurality of storage drives, and detect time intervals during which the target UMO experiences overload of the potentially shared hardware component by detecting time intervals during which the target UMO has an average response time that is greater than the maximum un-overloaded response time of the lowest performing type of storage drive in the plurality of storage drives.

17. The data storage system of claim 15, wherein each UMO comprises a storage group including one or more storage objects;

wherein the at least one hardware component potentially shared between the target UMO and each competing UMO comprises a plurality of storage drives having a single level of performance; and wherein the program code, when executed by the processing circuitry, further causes the processing circuitry to detect time intervals during which the competing UMO experiences overload of the potentially shared hardware component by detecting time intervals during which the competing UMO has an average response time that is greater than a maximum un-overloaded response time of the storage drives in the plurality of storage drives, and detect time intervals during which the target UMO experiences overload of the potentially shared hardware component by detecting time intervals during which the target UMO has an average response time that is greater than the maximum un-overloaded response time of the storage drives in the plurality of storage drives.

18. The data storage system of claim 10, wherein the at least one hardware component potentially shared between the target UMO and each competing UMO comprises one or more hardware components contained within an external data storage system, wherein the external data storage system is communicably coupled to the data storage system and provides units of storage from non-volatile storage devices contained within the external data storage system that are used to persistently store host data indicated by host I/O operations received by the data storage system that are directed to the target UMO and the competing UMOs.

19. A computer program product, comprising:

a non-transitory computer readable medium storing program code for applying performance controls in a data storage system based on overload correlations between units of managed storage objects (UMOs), which when carried out by processing circuitry, causes the processing circuitry to perform a method of:

detecting that a performance indicator for a target UMO is outside an acceptable range; and in response to detecting that the performance indicator for the target UMO is outside the acceptable range, i) generating an overload correlation between the target UMO and each competing UMO in a set of competing UMOs, wherein each competing UMO potentially shares at least one hardware component with the target UMO, wherein the overload correlation between the target UMO and each competing UMO indicates an amount of correlation between the performance indicator for the target UMO and a performance indicator for the competing UMO, and ii) applying a performance control to the throughput of at least one of the competing UMOs responsive to the overload correlations between the target UMO and the competing UMOs, wherein applying the performance control reduces the throughput of the competing UMO by an amount that is based on the size of the overload correlation between the target UMO and the competing UMO, to bring the performance indicator for the target UMO within the acceptable range.

20. The method of claim 1, wherein applying the performance control to the throughput of at least one of the competing UMOs comprises reducing the throughput of the competing UMO at least in part by adding a delay to a response time for completing I/O operations directed to at least one storage object in the competing UMO.

21. The method of claim 1, wherein applying the performance control to the throughput of at least one of the competing UMOs comprises reducing the throughput of the competing UMO at least in part by limiting a rate at which host I/O operations directed to at least one storage object in the competing UMO are accepted for processing by the data storage system.

22. The method of claim 20, wherein an amount of the delay added to the response time for completing I/O operations directed to the at least one storage object in the competing UMO is based on the size of the overload correlation between the target UMO and the competing UMO.

23. The method of claim 21, wherein limiting the rate at which host I/O operations directed to at least one storage object in the competing UMO are accepted for processing by the data storage system comprises applying a rate limit to the rate at which host I/O operations directed to at least one storage object in the competing UMO are accepted for processing by the data storage system, and wherein the applied rate limit is based on the size of the overload correlation between the target UMO and the competing UMO.

* * * * *